Patented Nov. 7, 1933

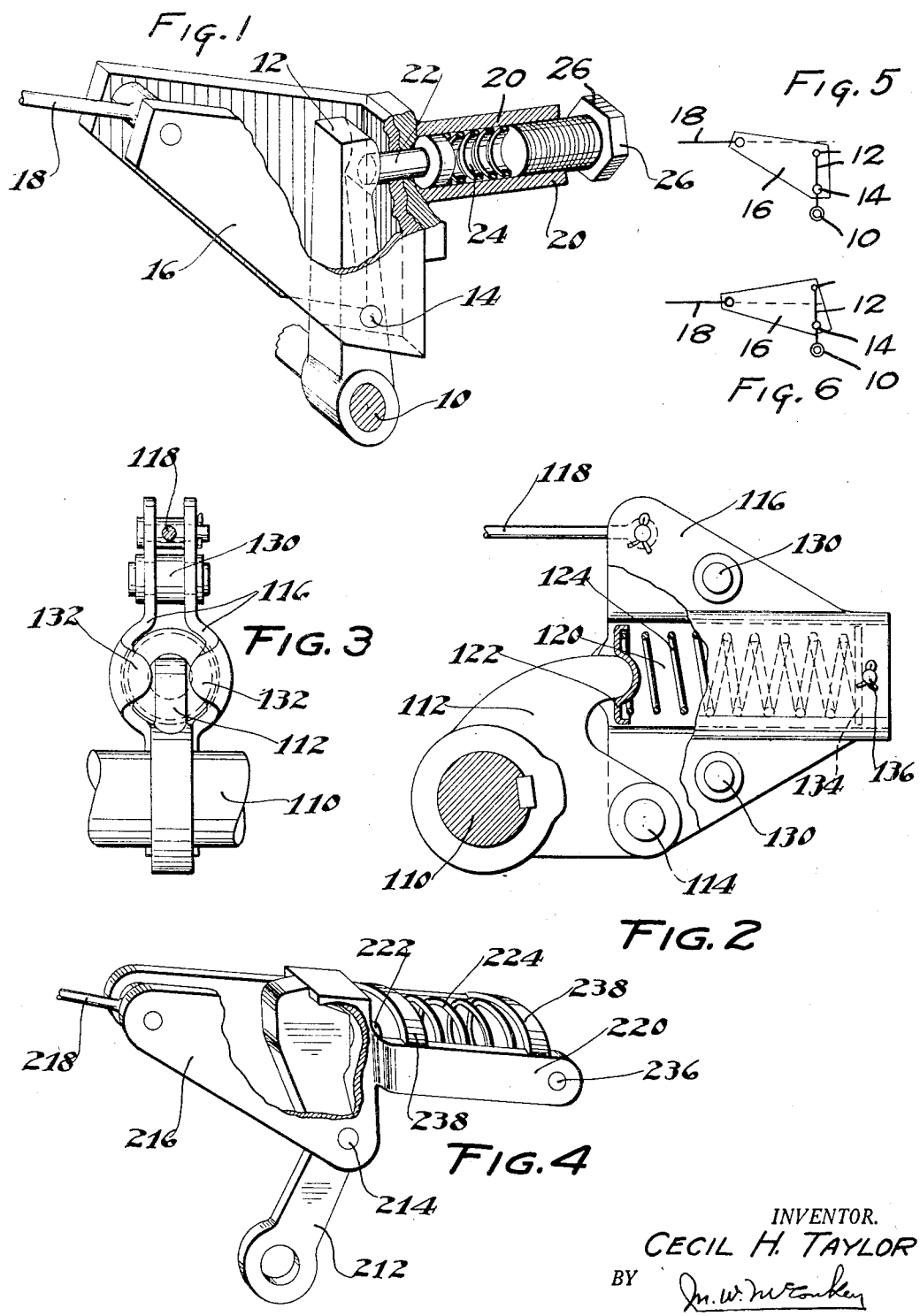

1,934,456

UNITED STATES PATENT OFFICE 1,934,456

CONNECTION

Cecil H. Taylor, South Bend, Ind., assignor to Bendix Brake Company, South Bend, Ind., a corporation of Illinois Application March 21, 1931. Serial No. 524,321

10 Claims. (Cl. 74—110)

This invention relates to over-running connections of the type used for operating automobile brake shafts and the like, and is illustrated as embodied in a device through which the service pedal (or the hand lever) operates the shaft without interfering with independent movement of the shaft when it is operated by the hand lever (or pedal).

An object of the invention is to provide a device of this character having two points of effective engagement with a lever or equivalent means which operates the shaft, preferably with different effective leverages for the two points of engagement. One great utility of a device of this character is to provide a relatively high leverage for normal brake application, with a lower leverage available in an emergency when it is desirable suddenly to apply unusual force to the brakes. As the device is effective in two stages, the second or lower-leverage stage affords in effect a yielding stop which must be overcome in order to apply sufficient force to the brakes to lock the wheels.

Preferably the device comprises means unyieldingly pivoted to, or otherwise engaging, a lever on the brake shaft at the point of lower leverage, and having a yieldingly-operating part, such as a novel spring-backed plunger, engaging the lever at the point of higher leverage. Thus force enough to collapse the spring must be applied before the lever can be operated through the pivotal connection. The device is preferably in the form of a yoke permitting independent or over-running movement of the lever.

Various important minor features relate to the structure and arrangement of the yoke and the plunger and its spring, and to other novel and desirable particular constructions and arrangements which will be apparent from the following description of the illustrative embodiments shown in the accompanying drawing, in which:

Figure 1 is a perspective of a first embodiment, partly broken away to show the novel arrangement of the spring;

Figure 2 is a side elevation of a second modification, also partly broken away;

Figure 3 is an end elevation, looking from the left in Figure 2, of this second embodiment;

Figure 4 is a perspective, partly broken away, of a third embodiment;

Figure 5 is a diagram illustrating the normal length of the effective lever arm; and Figure 6 is a diagram illustrating the shifting of the leverage when the brake operating mechanism meets with resistance.

In the arrangement illustrated in Figure 1, the usual brake shaft 10 has fixedly mounted thereon an operating lever 12, to which is connected unyieldingly, for example by a pivot 14, a novel yoke 16 embracing the upper end of the lever and connected to the service pedal (or emergency brake hand lever) by means such as as a brake rod 18.

The yoke 16 or its equivalent is provided, in this embodiment, with a cylinder 20 welded or otherwise secured to its back, and containing a lever-engaging plunger 22 backed up by a spring 24 the tension of which may be varied by adjusting a threaded stop 26. Plunger 22 may be formed with a head normally held by spring 24 against a shoulder formed at the end of cylinder 20.

Normal tension on rod 18, for ordinary brake applications, acts with a relatively high leverage on the shaft 10 through engagement of plunger 22 with lever 12. In an emergency, however, the driver can apply additional force, whereupon the spring 24 collapses, and the force acts through the lower leverage at pivot 14, plus the yielding action of spring 24 acting through plunger 22 at the higher leverage. Thus normally the force applied to the brakes is not greater than the tension of spring 24, preferably just insufficient to lock the wheels, but by applying sufficient force to go on through the yielding stop thus provided the driver can go ahead and apply further force to his brakes. On the other hand this action cannot take place unless the driver intends it.

It will be seen that lever 12 can turn in a brake-applying direction independently of the yoke, so that the connection is an over-running one.

In the modification of Figures 2 and 3, the brake shaft 110 has keyed thereto a lever 112, connected by a pivot 114 to a yoke 116 formed by two steel stampings fastened together by means such as spacers 130, and stamped out to form the opposite sides of an integral cylinder 120 containing a stamped steel plunger 122 backed by a compression spring 124.

Plunger 122 is formed with a socket embracing a nose formed on lever 112 and which is guidingly embraced between lugs 132 formed on the stampings making up yoke 116. The end of spring 124 is seated against a washer or the like 134 held by a cross-pin 136.

In Figure 4, the lever 212 has connected thereto by a pivot 214 a one-piece channel-shaped stamped yoke 216, provided with rearwardly-extending arms 220 which, with straps 238, form a skeleton cylinder for spring 224 against which is seated the head of plunger 222.

While several illustrative embodiments have been described in detail, it is not my intention to limit the scope of the invention to those particular embodiments, or otherwise than by the terms of the appended claims.

I claim:

1. A lever having a yoke pivoted thereto and provided with a cylinder in line with the lever, a spring in said cylinder, and a plunger backed up by said spring and engaging the lever, the pivotal mounting of the yoke and the point of engagement of the plunger being at different distances from the fulcrum of the lever.

2. A lever having a yoke pivoted thereto and provided with a cylinder in line with the lever, a spring in said cylinder, and a plunger backed up by said spring and engaging the lever.

3. A yoke adapted to be pivoted to a lever and provided with a cylinder in line with the lever, a spring in said cylinder, and a plunger backed up by said spring and engaging the lever, the pivotal mounting of the yoke and the point of engagement of the plunger being at different distances from the fulcrum of the lever.

4. A yoke adapted to be pivoted to a lever and provided with a cylinder in line with the lever, a spring in said cylinder, and a plunger backed up by said spring and engaging the lever.

5. A device of the class described comprising a lever, a pivot therefor, means for actuating said lever about said pivot with one effective lever arm and means responsive to increased resistance on said lever arm for actuating said lever about the same pivot with a shorter effective lever arm.

6. A lever having a pair of spaced plates pivotally connected thereto, a cylinder formed by portions of said plates in line with the lever, a spring in said cylinder, and a plunger contacted by said spring and engaging said lever.

7. A lever having a pair of spaced plates pivotally connected thereto, a cylinder formed by portions of said plates in line with the lever, a spring in said cylinder, and a plunger contacted by said spring and engaging said lever, said plunger being formed with a recess for the reception of the end of said lever.

8. A lever having a pair of spaced plates pivotally connected thereto and provided with a cylinder in line with the lever, and with a spring in said cylinder acting upon said lever.

9. A lever having a pair of spaced plates pivotally connected thereto, a spring associated with said plates in line with and acting upon said lever, and means associated with said plates for containing said spring.

10. A lever having a pair of spaced plates pivotally connected thereto, a spring associated with said plates in line with and acting upon said lever, and means associated with said plates for containing said spring, said means comprising rearwardly extending arms secured to said plates, and straps between said arms forming a casing for said spring.

CECIL H. TAYLOR.